Patented Oct. 5, 1954

2,691,021

UNITED STATES PATENT OFFICE 2,691,021

TRIMERIZATION OF t-ALKYL CYANAMIDES

Donald W. Kaiser, Old Greenwich, and Ingenuin Hechenbleikner, Norwalk, Conn., assignors to American Cyanamid Company, New York, N. Y., a corporation of Maine No Drawing. Application January 25, 1952, Serial No. 268,338

7 Claims. (Cl. 260—249.6)

The present invention relates to trimerization of t-alkyl cyanamides to produce the corresponding trisubstituted t-alkyl melamines, a new class of compounds of the formula

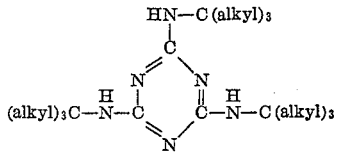

In view of the fact that the primary and secondary alkyl cyanamides trimerize to yield the corresponding trisubstituted isomelamine (cf. Andreason, Monatsh, 2, p. 277 [1865], and Ericks et al., U. S. Patent 2,331,670 [1943]) the trimerization of the t-alkyl cyanamides to the substituted normal melamine is surprising.

The trimerization of the instant invention is carried out under substantially the same conditions well known for the trimerization of the primary and secondary alkyl cyanamides, i. e., by refluxing the substituted cyanamide in an inert solvent under reflux for several hours, preferably in the presence of a strong alkali catalyst.

The following examples illustrate without limiting the invention.

Example 1

A mixture of 25 g. of t-butyl cyanamide, 1 pellet of potassium hydroxide catalyst, 100 ml. methanol, and 100 ml. water was heated under reflux for 24 hours. A homogeneous reaction mass resulted upon heating and remained throughout the reaction. After the 24-hour period the reaction solution (at room temperature) was poured into 200 ml. of water at room temperature. Crystals of tri-t-butyl normal melamine (5 g.) separated, M. P. 175–180° C.

Example 2

Ten parts of t-octyl cyanamide was dissolved in 100 parts of 50% ethanol-water and 0.1 part sodium hydroxide catalyst added. The solution was refluxed for eight hours, after which most of the ethanol was distilled off under water pump reduced pressure. Eight parts of tri-t-octyl-n-melamine separated in the remaining menstruum, and was filtered and dried. The product melted at 160° C.

Other t-alkyl cyanamides, such as t-amyl cyanamide, t-hexyl cyanamide, t-heptyl cyanamide, t-decyl cyanamide, t-dodecyl cyanamide, and the like can be trimerized by the same treatment, yielding the corresponding tri-t-alkyl-n-melamine. The t-alkyl cyanamides can be prepared by reacting the corresponding t-alkyl amine with cyanogen chloride in cold aqueous alkaline solution, e. g., by the procedure described in U. S. Patent 2,331,670 to Ericks et al.

In the reaction of the instant invention, various inert solvents can be employed, including the glycol monoethers, the alkanols, water, and other well known solvents employed in the trimerization of primary and secondary cyanamides. Strong alkalis that can be used as catalysts include the alkali metal oxides, hydroxides, alcoholates, carbonates, dicyandiamides, e. g.,

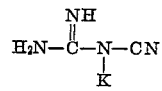

and the like. The strong alkali can be used in any amount, but best results are obtained when the catalyst is employed in an amount about 0.1–10.0% of the t-alkyl cyanamide.

The temperature of reaction is not critical. Some trimerization occurs simply by allowing the t-alkyl cyanamide to stand in the solvent (comprising the catalyst) at room temperature for a few weeks. However, the trimerization is greatly accelerated by heating the solution to at least 50° C., and still more preferably to reflux.

The substituted melamines of the present invention are useful in the preparation of synthetic resins, surface active agents, and as intermediates in organic reactions.

While the invention has been described with particular reference to specific embodiments, it is to be understood that it is not to be limited thereto but is to be construed broadly and restricted solely by the scope of the appended claims.

We claim:

1. The method of preparing a substituted melamine of the formula

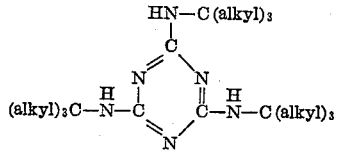

that consists in heating a t-alkyl cyanamide in an inert solvent comprising a strong alkaline catalyst, said inert solvent consisting of equal parts by weight of water and an alcohol selected from the class consisting of methanol and ethanol.

2. The method according to claim 1 in which the t-alkyl cyanamide is t-butyl cyanamide.

3. The method according to claim 1 in which the t-alkyl cyanamide is t-octyl cyanamide.

4. The method according to claim 1 in which the alkali is an alkali metal hydroxide.

5. The method of preparing a tri-t-alkyl-n-melamine that comprises refluxing a solution of a t-alkyl cyanamide in a solvent consisting of equal parts by weight of methanol and water in the presence of an alkali metal hydroxide catalyst, said catalyst being about 0.1–10% by weight of the t-alkyl cyanamide.

6. The method according to claim 5 in which the t-alkyl cyanamide is t-butyl cyanamide.

7. The method according to claim 5 in which the t-alkyl cyanamide is t-octyl cyanamide.

References Cited in the file of this patent

UNITED STATES PATENTS

| Number | Name | Date |
| --- | --- | --- |
| 2,361,823 | D'Alelio | Oct. 31, 1944 |
| 2,606,923 | Bortnick | Aug. 12, 1952 |